Figure 1:
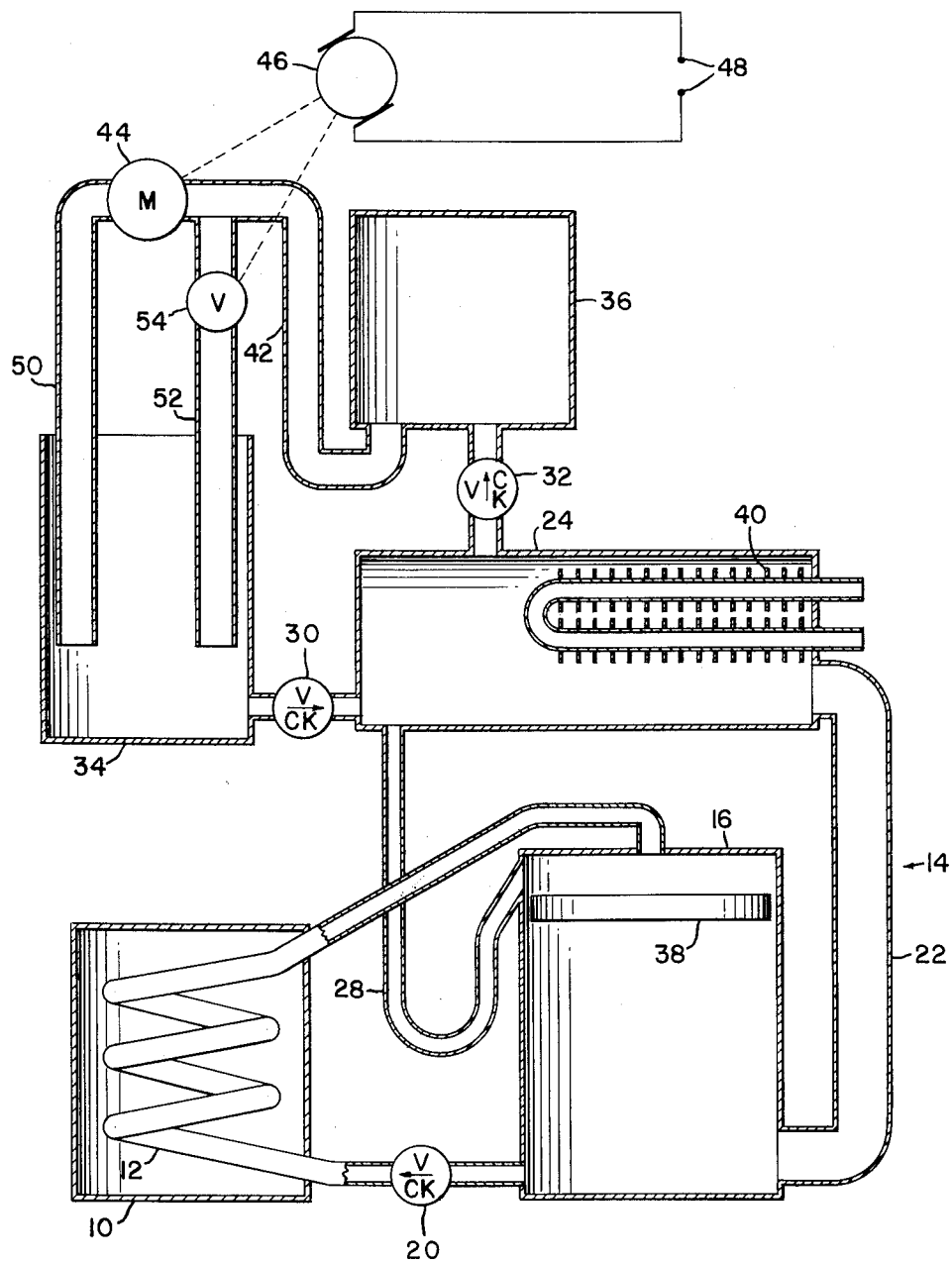

March 7, 1961  C. D. MacCRACKEN  2,973,715
ELECTRICAL GENERATING SYSTEMS
Filed Aug. 1, 1955  2 Sheets-Sheet 1

INVENTOR.
CALVIN D. MacCRACKEN
BY James M. Relph
ATTORNEY

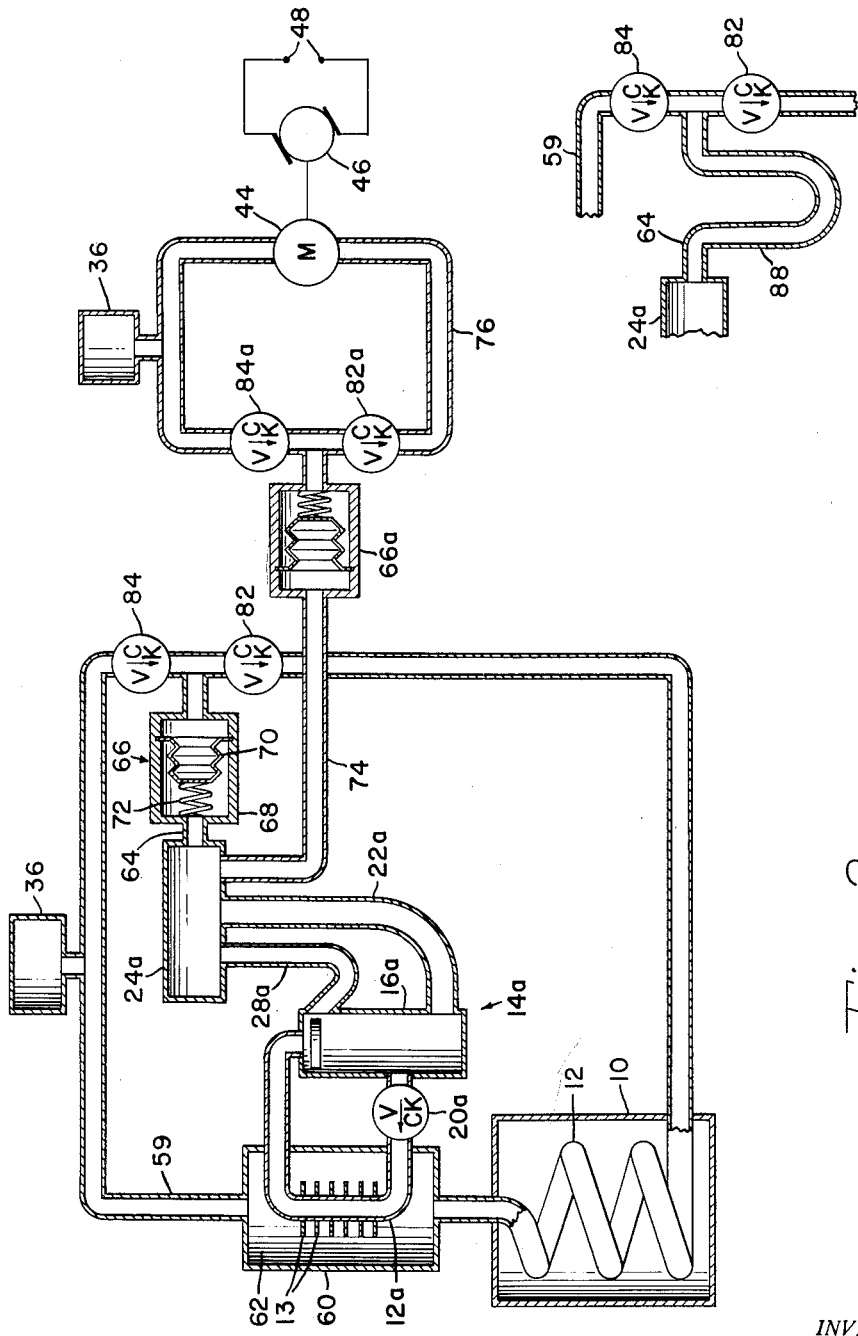

United States Patent Office 2,973,715
Patented Mar. 7, 1961

2,973,715
ELECTRICAL GENERATING SYSTEMS
Calvin D. MacCracken, Tenafly, N.J., assignor to Jet-Heet, Inc., Englewood, N.J., a corporation of New York Filed Aug. 1, 1955, Ser. No. 525,586

11 Claims. (Cl. 103—44)

This invention relates to improvements in electrical generating systems, and particularly to an improved system for converting heat energy into electrical energy.

It is among the objects of the present invention to provide an improved heat-actuated electrical generating system for situations where conventional conversion apparatus, such as those involving steam turbines and the like, are not suitable because of bulky size, high cost or other limitations. Another object of the invention is the provision of an improved arrangement for self-circulation of a hot liquid, and particularly where the hot liquid is supplying power for an electrical generating system. A further object of the invention is the provision of an improved heat operated pumping system of high efficiency. Another object of the invention is the provision of an improved system for circulating a coolant liquid in a nuclear reactor and for extracting power from the circulating coolant.

In accordance with a preferred embodiment of the invention, the foregoing and other related objects and advantages are obtained in a system wherein a heat actuated pump is utilized to circulate liquid through a liquid-actuated prime mover for driving an electric generator. The prime mover may comprise a liquid turbine, a hydraulic motor or the like. In accordance with one feature of the invention, the system may include an arrangement wherein the heat contained in a hot liquid is utilized both to supply power for circulating the liquid through a heat supply element and to supply power for operating the prime mover. In accordance with another feature of the invention, a secondary liquid may be used in a heat actuated pump to give high pumping efficiency for circulating a primary liquid through the prime mover. Where the heat source comprises a nuclear reactor, the invention also contemplates and its practice provides a self-circulation system for the reactor coolant whereby merely energizing the reactor will initiate circulation of the coolant.

A more complete understanding of the invention, and of further objects and features thereof, can be had by reference to the following description of an illustrative embodiment thereof, when considered in connection with the accompanying drawing, wherein Figure 1 is a schematic diagram of an electrical generating system embodying the invention, Figure 2 is a schematic diagram of a modified version of the electrical generating system shown in Figure 1, and Figure 3 shows an alternative arrangement for separating pumped and pumping liquids in a system embodying the invention.

While not limited thereto, the present invention finds particular application in and will be described with special reference to a heat-actuated electrical generating system wherein the heat source comprises a nuclear reactor. As used herein and in the appended claims, the term "nuclear reactor" is intended to designate a device in which a controlled process of nuclear fission or nuclear transformation takes place, accompanied by the release of heat within the device.

Referring to Figure 1 of the drawing, there is shown a system embodying the invention for generating electric power from heat energy supplied by a nuclear reactor 10. For simplicity, the details of the reactor are not shown, as they may take many different forms. It will be understood that the heat source may also comprise a solid or fluid fuel burner, a waste heat element such as the condenser of a steam system, or any comparable means. In any case, the heat source includes a heat exchange element comprising a tube 12 through which liquid is circulated to extract heat from the source 10. In the embodiment of the invention presently being considered, the heat exchange tube 12 is also the vapor generating tube or vaporizer of a heat actuated pump 14, referred to hereinafter as a thermopump.

Briefly, a thermopump comprises an arrangement of tubes and vessels in which a liquid is alternately vaporized and condensed to create cyclical variations in fluid volume within the pump. These cyclical volume variations are utilized to force liquid into and out of the pump through a pair of check valves.

In the thermopump 14 shown in Figure 1, the vaporizer tube 12 is connected at its upper end to an upright, substantially cylindrical vessel 16 defining a chamber within which to collect vapor. The lower end of the vaporizer tube is connected to the bottom of the vapor collector 16. Preferably, the connection between the lower ends of the vaporizer and the vapor collector includes a check valve 20 which permits liquid flow only from the collector into the vaporizer and not in the opposite direction.

The collector 16 preferably contains a float element 38 of the type described and claimed in U.S. Patent No. 2,744,470 to Coleman.

The bottom of the vapor collector 16 also is connected by a coupling tube 22 to a vessel 24 defining a condenser chamber above the vapor collector. A parallel connection from the vapor collector 16 to the condenser 24 comprises a relatively small diameter U-shaped tube 28 for transferring vapor. The vapor tube extends downwardly from the vapor collector and then upwardly to the condenser at a point somewhat above the top of the vapor collector.

The condenser 24 may also contain a coil 40 through which to circulate a liquid for cooling purposes, as described in U.S. Patent No. 2,757,618 to Kleen.

Inlet and outlet connections for the pump include a pair of check valves 30, 32, one of which (30) permits liquid flow into the condenser 24 from a reservoir 34, and the other of which (32) permits liquid flow out of the condenser into an accumulator tank 36.

Assuming that the pump 14 is completely filled with liquid initially, when heat is applied to the vaporizer tube 12 the liquid therein will be vaporized, and the vapor will collect in the upper portion of the vaporizer tube. As heating continues, forming more vapor, the vapor will continue to collect in the upper end of the vaporizer and in the upper portion of the vapor collector 16, gradually forcing the liquid level to drop in the collector 16 and in the associated leg of the vapor tube 28. As the vapor collects, liquid will be displaced from the pump through the outlet check valve 32, the general direction of flow being downward in the collector 16 and upward through the condenser 24.

This action will continue until the liquid levels in the vapor tube 28 and in the collector 16 drop to the lowermost part of the vapor tube 28. Up to this time, the pressure exerted by the vapor on the liquid surface in the vapor tube and (through the float 38) on the surface of the liquid in the vapor collector 16 will balance the head pressure exerted by the column of liquid standing in the condenser 24 and the associated coupling tube 22. However, once the vapor in the vapor tube 28 passes the lowermost part of the U, the head pressure exerted by the foregoing column of liquid will no longer be supported by the vapor pressure, since the vapor will be free to pass upwardly through the vapor tube. Once this action starts, liquid will flow into the vapor collector 16 through the tube 22 from the condenser 24, forcing vapor ahead of it out of the collector 16 and through the vapor tube 28 into the condenser. As this vapor enters the condenser it will encounter cool liquid and will condense rapidly. This will immediately lower the pressure in the pump, causing liquid to flow into the pump through the inlet check valve 30 to replace the volume occupied by the vapor before condensation. As soon as the pump has completely refilled, vapor again will start to collect in the upper part of the collector 16 and the cycle will repeat.

The check valve 20 at the inlet end of the vaporizer tube 12 serves the function of maintaining a quantity of liquid in the vaporizer tube at all times to insure a supply of vapor therefrom. Without the check valve, the liquid level in the vaporizer will go down in step with the drop in liquid level in the vapor collector and in the vapor tube. This will result in having a decreasing quantity of liquid exposed to the heat from the source 10, and may interfere with pump operation by reducing the rate of vaporization.

The float 38 provides a stable surface over which to collect vapor in the collector 16. Without the float, turbulence in the collector may cause some condensation which will slow down pumping action.

The cooling element 40 in the condenser 24 serves to maintain the temperature in this chamber at a level low enough to insure condensation of the vapor when it passes to the condenser. Of course, in some instances ample cooling may be had by heat loss to the atmosphere from the surface of the condensing vessel itself. Again, the flow through the condenser 24 may be adequate to keep the temperature at a safe level, if the motor circuit has enough heat loss surface to dissipate the heat. Alternately, the heat delivered to the condenser may be utilized to operate another thermopump in the manner shown in the copending application of N. E. af Kleen, filed August 24, 1955, Serial No. 530,387, and assigned to the assignee of the present invention.

In the accumulator tank 36, the cyclical pulsations in liquid delivery are absorbed by a body of gas (e.g., air) above the surface of the liquid to insure a nearly uniform flow in the load circuit once the pump is in steady state operation.

From the accumulator 36, a coupling line 42 leads to a liquid actuated prime mover 44 which is mechanically coupled to an electric generator 46 for providing electric power at output terminals 48. The outlet side of the prime mover is connected by a return line 50 to the reservoir 34, which communicates through the inlet check valve 30 with the condenser 24.

In order to regulate the system for varying load demands, a by-pass line 52 is provided from the prime mover inlet line 42 to the reservoir 34, with a regulating valve 54 for adjusting flow through the by-pass line. The regulating valve 54 is provided with suitable controls, such as a speed-sensing device coupled to the generator shaft, so that when the load on the generator increases, the by-pass valve 54 will tend to close, forcing more liquid to flow through the prime mover. When the demand on the system decreases, the valve will automatically open to by-pass more fluid around the prime mover.

It can be seen that the system shown in Figure 1 has an important advantage over other systems for converting heat energy into electric power, in that the conversion is accomplished with a minimum number of moving parts to require maintenance or servicing. This is particularly important with nuclear reactor heat sources, where it is often extremely inconvenient to get at the parts for servicing.

In the system shown in Figure 1, it is contemplated that the pressure and temperature conditions will be such that boiling will take place within the heat exchange coil 12 which doubles as the thermopump vaporizer. If the heat source 10 comprises a nuclear reactor, however, it is sometimes required that no boiling take place in the coil 12. When this is the case, it becomes necessary to use the heat in the liquid at some point outside the reactor. In general, this requires that the liquid be circulated continuously through a circuit which connects the coil to some secondary heat exchange device where the useful heat can be extracted. Conventionally, this would require a mechanical pump for circulating the coolant in addition to the conversion apparatus for extracting useful energy from the coolant at the secondary heat exchanger. In turn, this means that some auxiliary power source must be provided at least for starting the mechanical pump to put the system in operation. In other words, if the pump is driven by a motor which is supplied with current generated by heat from the reactor, it will be necessary to circulate a substantial quantity of coolant through the reactor and secondary heat exchanger before sufficient power can be generated to operate the coolant pump. In accordance with a feature of the present invention, however, the coolant liquid can be self-circulated, thereby eliminating the additional complication of a pump and motor combination as well as the need for supplying auxiliary starting power. Another very important advantage is that the coolant circuit can be hermetically sealed, thereby precluding any chance of leakage of radioactive liquid.

Such an arrangement embodying the invention is illustrated in Figure 2 of the drawing, wherein the reactor cooling coil 12 is connected in a circuit 59 which includes a tank or vessel 60 defining a chamber 62 conveniently referred to as a heat sump. The tank 60 encloses the vaporizer tube 12a of a thermopump 14a which corresponds functionally with the thermopump 14 shown in Figure 1. In the Figure 2 system, the outlet from the thermopump 14a comprises a coupling tube 64 which leads from the pump condenser 24 to a bellows assembly 66.

The bellows assembly 66 serves either as a pressure translating element, or as a separator between dissimilar liquids, or both. Pressurewise, it will be recalled that one of the conditions imposed on the system is that no boiling can occur in the reactor cooling circuit 59. Assuming water as the coolant, and a liquid temperature of, say, 500° F. within the coil 12, then the pressure in the cooling circuit 59 must be greater than 680 p.s.i.a. to prevent boiling. On the other hand, if the pump 14a also is filled with water, it is evident that the pump must operate at a lower pressure level in order to form vapor, which explains the need for the pressure translator. As is explained hereinafter, it is also feasible to use different liquids in the pump and in the cooling circuit, in which case the bellows or an equivalent element may be used as the liquid separator.

The assembly 66 includes a housing 68 enclosing an expansible bellows 70 which is partially compressed by a spring 72. The pump 14a communicates with the housing 68 outside the bellows element 70 through the coupling tube 64. The portion of the housing 68 which communicates with the space inside the bellows element is connected in the cooling circuit 59 between a pair of check valves 82, 84.

For the sake of illustration, it can be assumed that the pressure within the pump 14a is, say 400 p.s.i.a. when the system is at rest. The pressure difference of 280 pounds across the bellows 70 will be balanced by the spring 72.

In the system as thus far described, when the reactor 10 is energized, the temperature of the cooling liquid in the coil 12 immediately will begin to rise. As the temperature goes up, warmed liquid will move by thermogravitational circulation up into the heat sump 62. When the temperature of the liquid in the sump 62 reaches the boiling point for the liquid in the pump, vapor will form in the vaporizer 12a, as previously described. For more efficient heat transfer the vaporizer tube 12a may be provided with fins 13, as shown.

Once vaporization starts in the pump, liquid will be forced out of the pump condenser 24a and into the bellows housing 68, compressing the bellows 70. In turn, liquid will be forced out of the other side of the housing 68 and through the downstream check valve 82. When condensation occurs in the pump, the bellows will expand, thereby drawing liquid into the housing 68 through the upstream check valve 84. To absorb the volume changes transferred to the cooling circuit 59 by the cyclical action of the pump, the cooling circuit is provided with an accumulator 36.

Thus, once the reactor 10 is energized, the thermopump 14 will insure positive circulation through the cooling circuit 59 to carry heat away from the reactor, and at the same time will utilize the heat contained in the circulating liquid for self-induced circulation. Of course, the circuit 59 may include an auxiliary radiator if the heat extracted by the pump does not drop the coolant temperature sufficiently.

The same pump also converts heat energy in the cooling liquid into electrical energy by connecting the thermopump condenser to a prime mover circuit 76 by a branch line 74.

In order to eliminate the need for high pressure rotary seals in the prime mover circuit, it is deemed preferable to couple the pump to the circuit 76 through a pressure translating element 66a, similar to the element 66 connecting the pump to the coolant circuit, so that the circuit 76 will not be pressurized. Like the coolant circuit, the circuit 76 will include a pair of check valves 82a, 84a between which the connecting line 74 is coupled. Functionally, the circulation in the prime mover circuit 76 will be the same as the circulation in the cooling circuit 59, with the exceptions that the circulation in the circuit 76 will be of much greater volume per unit time, and will involve substantially greater pressure drops, than in the coolant circuit 59.

It should be noted that there are a great many possible variations in the pressure relationships between the coolant circuit, the prime mover circuit and the pump section of the system, depending on the liquids used in these various sections.

For example, the use of certain liquids in the pump will give a greater overall system efficiency than others, although the same liquids may not be suitable for the coolant and/or prime mover circuits. It can be seen that the pumping efficiency will depend on how much heat is required to produce a unit volume of vapor under given pressure conditions. Also, it will be appreciated that different liquids have different characteristics in this respect. For example, the organic liquid 2-chloroethyl-ethyl-ether has a latent heat of vaporization, at 14.7 p.s.i.a. and 227° F., of 19.5 B.t.u.'s per cubit ft. of vapor, whereas water has 36.2 B.t.u.'s per cubic ft. of steam at 14.7 p.s.i.a. and 212° F. Thus, it can be seen that for each unit of heat input, a substantially greater volume of the organic vapor can be produced than of steam. Accordingly, it may be preferable to utilize the organic liquid in the pump section of the system, although the same liquid may not be suitable for, say, the coolant circuit. In the coolant circuit, the organic liquid could be expected to decompose due to radioactive bombardment. However, the organic liquid would be quite suitable in the prime mover circuit. As a matter of fact, the organic liquid has the further advantage that it can be mixed as an emulsion with a higher boiling point lubricating oil, such as mineral oil, which will lubricate the prime mover without appreciably affecting the higher efficiency of the organic liquid for heat-actuated pumping. This is because the lower boiling point liquid would boil off in the pump vaporizer and produce the pumping effect. Then it would condense again in the pump condenser and remix with the solution. Thus, a good combination would be water in the coolant circuit, separated by the bellows 66 from 2-chloroethyl-ethyl-ether in the pump and prime mover circuits. In this case, the second bellows 66a would not be needed.

Another very practical combination of liquids is to use mercury as the coolant liquid, and water (or the foregoing organic liquid) as the pumping and prime mover circuit liquids. Because of the substantial difference between the boiling points of water and mercury, the mercury in the coolant circuit and the water in the pump unit can be at the same pressure, and due to their different densities, they can be separated merely by a U-tube 88, as shown in Figure 3. This would eliminate both of the pressure translators 66, 66a in the Figure 2 system.

What is claimed is:

1. A system for circulating a liquid through a heat exchanger comprising, a liquid-conducting circuit defining a closed path for conducting liquid around said closed path in one direction, said circuit communicating with said heat exchanger, means defining a chamber in said circuit located above said heat exchanger into which heated liquid can flow in said one direction from said heat exchanger by thermogravitational circulation, whereby the conduction of liquid in said circuit commences upon the introduction of heat into said heat exchanger, a heat-actuated pump unit comprising a vaporizer within which to vaporize liquid by heating, a condenser within which to condense vaporized liquid and coupling means connecting said vaporizer and said condenser through which to transfer liquid and vapor therebetween, said pump unit being filled with a liquid adapted to boil at a lower temperature than the boiling point of the liquid in said circuit, a pair of check valves in serial relationship in said circuit, said check valves both conducting in said one direction, means connecting said pump unit to said circuit at a point between said check valves and into which to withdraw liquid from said circuit through one of said valves during condensation of vapor in said pump unit and from which to discharge liquid into said circuit through the other of said valves during vaporization of liquid in said pump unit, said vaporizer being in heat exchange relationship with the liquid in said chamber to receive heat from the liquid in said chamber, thereby to pump the liquid around said closed path in said one direction.

2. A system as defined in claim 1 wherein said pump unit is filled with liquid including 2-chloroethyl-ethyl-ether.

3. A system as defined in claim 1 wherein the liquid-containing portion of said system is filled with a mixture of 2-chloroethyl-ethyl-ether and an oil having a higher boiling point than said ether.

4. A system for pumping a liquid by means of the heat energy contained in said liquid wherein the circulation of the liquid is aided by thermogravitational effect, said system comprising a continuous circuit through which to circulate said liquid in a predetermined direction of flow, a source of heat for the liquid in said circuit, the liquid in said continuous circuit leaving said source of heat at a point higher in elevation than the point at which said liquid reaches said source of heat, a pump comprising a liquid-filled system including a vaporizing section within which to vaporize liquid by heating to displace liquid from said system, a condenser section within which to condense vaporized liquid to draw liquid into said system, and vapor and liquid conduits connecting said sections for the transfer of vapor and liquid therebetween, said system being filled with a liquid adapted to boil at a temperature lower than the temperature of the liquid in said continuous circuit, a pair of check valves in serial relationship in said continuous circuit, said check valves both conducting the liquid in said continuous circuit in said predetermined direction, and pressure transfer means connecting said pump to said continuous circuit between said check valves and into which to withdraw liquid from said circuit through one of said valves during condensation of vapor in said pump and from which to discharge liquid into said circuit throgh the other of said valves during vaporization of liquid in said pump, said vaporizing section of said pump being in heat exchange relation with a portion of said continuous circuit whereby to vaporize the liquid in said vaporizing section of said pump by the heat contained in the liquid in said circuit.

5. The invention defined in claim 4, wherein said pressure transfer means connecting said pump to said circuit comprises a conduit having a movable liquid separator therein separating the liquid contained in said continuous circuit from the liquid contained in said pump.

6. The invention defined in claim 5, wherein said pump and said circuit contain different liquids.

7. The invention defined in claim 5, wherein said pump and said continuous circuit contain the same liquid, wherein the pressure in said continuous circuit is higher than the minimum pressure in said pump, and wherein resilient means are coupled to said liquid separator to balance the pressure difference between the liquid in said continuous circuit and the liquid in said system.

8. A system for circulating a liquid coolant through a heat exchanger wherein the flow of the liquid coolant through the heat exchanger automatically begins upon the transfer of heat to the heat exchanger and is thereafter continued by heat-actuated pumping action comprising a first heat exchanger, a continuous circuit for the liquid coolant having a predetermined direction of conduction, said continuous circuit including a first and a second check valve in series therein and arranged to conduct the liquid coolant therethrough in said predetermined direction, said continuous circuit entering and leaving said heat exchanger, the point at which said circuit leaves said heat exchanger being higher in elevation than the point at which said circuit enters said heat exchanger, a second heat exchanger being included in said circuit into which the liquid coolant automatically begins flowing by thermogravitational effect upon the transfer of heat from the first heat exchanger to the cooling liquid, a heat-actuated pump at least partially filled with a pump liquid which is adapted to vaporize at a lower temperature than the temperature of said coolant liquid, said pump including a unit within which to collect and condense vapor and vaporizing means within which to vaporize the pump liquid, said vaporizing means being in heat exchange relationship with said second heat exchanger, and pressure transfer means connected from said pump to said continuous circuit at a point between said pair of check valves, said pressure transfer means drawing the coolant liquid through one of said check valves during the condensation of pump liquid in said pump unit and said pressure transfer means driving the coolant liquid through the other of said check valves during the vaporization of pump liquid in said vaporizing means, whereby the coolant liquid automatically begins to flow upon transfer of heat to said first heat exchanger and thereafter the heat-actuated pump maintains the flow of the coolant liquid through said first heat exchanger.

9. A system for circulating a liquid coolant through a heat exchanger wherein the flow of the liquid coolant through the heat exchanger automatically begins upon the transfer of heat to the heat exchanger and is thereafter continued by heat-actuated pumping action comprising a first heat exchanger, a continuous circuit for the liquid coolant having a predetermined direction of conduction, said continuous circuit including a first and a second check valve in series therein and arranged to conduct the liquid coolant therethrough in said predetermined direction, said continuous circuit entering and leaving said heat exchanger, the point at which said circuit leaves said heat exchanger being higher in elevation than the point at which said circuit enters said heat exchanger, a second heat exchanger being included in said circuit into which the liquid coolant automatically begins flowing by thermogravitational effect upon the transfer of heat from the first heat exchanger to the cooling liquid, a heat-actuated pump at least partially filled with a pump liquid which is adapted to vaporize at a lower temperature than the temperature of said coolant liquid, said pump including a unit within which to collect and condense vapor and vaporizing means within which to vaporize the pump liquid, said vaporizing means being in heat exchange relationship with said second heat exchanger, and means for translating the pressure from said pump to a point in said continuous circuit between said check valves while separating the pump liquid from the coolant liquid, said translating means including a chamber having a resilient bellows therein separating one side of said chamber from the other, one side of said chamber communicating with said pump and the other side of the chamber communicating with said point in the continuous circuit between said valves, the movement of said bellows drawing the coolant through one of said check valves during condensation of the pump liquid and said bellows driving the coolant liquid through the other of said check valves during vaporization of the pump liquid, whereby the coolant liquid automatically begins to flow upon transfer of heat to said first heat exchanger and thereafter the heat-actuated pump maintains the flow of the coolant liquid through said first heat exchanger.

10. A heat-actuated pump system comprising a vaporizing section within which to vaporize liquid by heating so as to generate an increase in pressure within the pump, a condenser section within which to condense the vaporized liquid so as to generate a decrease in pressure within the pump, a first conduit from the condenser section to the vaporizing section to transfer liquid from the condenser section to the vaporizer section, and a second conduit from the vaporizing section to the condensing section to transfer vapor thereto, a coupling line extending from said pump adapted to be connected to a load circuit, said coupling line including a pressure translating chamber, and a flexible bellows within said chamber for sealing the pump and being adapted to move back and forth in accordance with the changes in pressure in said pump thereby to translate the pumping action through said coupling line.

11. In a system for circulating a cooling liquid through a heat exchanger, in combination, a liquid-conducting circuit for conducting the liquid in a predetermined direction in a closed loop to cool the exchanger, said circuit including means defining a heat exchange passage extending through said exchanger and leaving the exchanger at a position higher in elevation than the position at which said passage enters the exchanger, means defining a chamber in said circuit located beyond said heat exchange passage into which heated liquid can flow from said passage by thermogravitational circulation, a heat-actuated pump unit comprising a vaporizer within which to vaporize liquid by heating, a condenser within which to condense vaporized liquid and coupling means connecting said vaporizer and said condenser through which to transfer liquid and vapor therebetween, said pump unit being filled with a liquid adapted to boil at a lower temperature than the boiling point of the liquid in said circuit, a pair of check valves in said circuit in serial relationship, said check valves both conducting the cooling liquid in said predetermined direction, means connecting said pump unit to said circuit between said check valves and into which to withdraw liquid from said circuit through one of said valves during condensation of vapor in said pump unit and from which to discharge liquid into said circuit through the other of said valves during vaporization of liquid in said pump unit, said vaporizer being in heat exchange relation with said chamber whereby to vaporize liquid in said pump unit vaporizer by heat contained in the liquid in said chamber, whereby the circulation of the cooling liquid in said predetermined direction begins by thermogravitational effect and said heat-actuated pump unit circulates the liquid in said predetermined direction.

References Cited in the file of this patent

UNITED STATES PATENTS

| | | |
|---|---|---|
| 97,225 | Prall | Nov. 23, 1869 |
| 939,757 | Taylor | Nov. 9, 1909 |
| 1,493,368 | Merz | May 6, 1924 |
| 2,553,817 | Kleen | May 22, 1951 |
| 2,593,963 | Biggs | Apr. 22, 1952 |
| 2,744,470 | Coleman | May 8, 1956 |
| 2,757,618 | Kleen | Aug. 7, 1956 |

FOREIGN PATENTS

| | | |
|---|---|---|
| 361,473 | Germany | Oct. 14, 1922 |

OTHER REFERENCES

"Nucleonics," published by McGraw-Hill Publishing Co., Inc., York, Pa., vol. 11, No. 6, page 54, June 1953.